United States Patent
Pope et al.

(10) Patent No.: US 8,286,193 B2
(45) Date of Patent: Oct. 9, 2012

(54) PROCESSING RECEIVED DATA

(75) Inventors: Steven Pope, Cambridge (GB); David Riddoch, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 1081 days.

(21) Appl. No.: 12/215,437

(22) Filed: Jun. 26, 2008

(65) Prior Publication Data

US 2008/0313655 A1 Dec. 18, 2008

(30) Foreign Application Priority Data

Jan. 10, 2006 (GB) .................................. 0600417.0
Dec. 28, 2006 (GB) ................. PCT/GB2006/004946

(51) Int. Cl.
G06F 3/00 (2006.01)
G06F 9/44 (2006.01)
G06F 9/46 (2006.01)
G06F 13/00 (2006.01)

(52) U.S. Cl. ....................................................... 719/319
(58) Field of Classification Search .................. 718/102; 719/319
See application file for complete search history.

(56) References Cited

U.S. PATENT DOCUMENTS

| | | | |
|---|---|---|---|
| 6,205,152 B1 | 3/2001 | Von Ahnen et al. | |
| 6,609,151 B1 | 8/2003 | Khanna et al. | |
| 6,795,873 B1 | 9/2004 | Barth et al. | |
| 7,356,818 B2 * | 4/2008 | Carollo et al. | 718/102 |
| 7,835,380 B1 * | 11/2010 | Aloni et al. | 370/419 |
| 2004/0064668 A1 | 4/2004 | Kjos et al. | |
| 2004/0139295 A1 | 7/2004 | Arimilli et al. | |
| 2005/0114855 A1 * | 5/2005 | Baumberger | 718/1 |
| 2005/0226165 A1 | 10/2005 | Pope et al. | |

FOREIGN PATENT DOCUMENTS

| | | |
|---|---|---|
| GB | 2 372 679 | 8/2002 |
| WO | 00/30321 | 5/2000 |

OTHER PUBLICATIONS

Cramming more components onto integrated circuits, Electronics, vol. 38, No. 8, pp. 114-117, 1965, Gordon E. Moore, Apr. 19, 1965.
Programming Semantics for Multiprogrammed Computations, Communications of the ACM, vol. 9, No. 3, pp. 143-155, Jack B. Dennis and Earl C. Van Horn, Mar. 1966.

(Continued)

*Primary Examiner* — Diem Cao
(74) *Attorney, Agent, or Firm* — Weide & Miller, Ltd.

(57) ABSTRACT

A computer system comprising hardware including a data interface for interfacing between the computer system and a data source; a memory; a first operating system capable of communicating with the hardware; and a second operating system capable of supporting a user-level application and being configured to communicate with the hardware via the first operating system, the second operating system being capable of allocating a region of the memory for use as a buffer by such a user-level application. The data interface is configurable to associate a predetermined data format with a region of the memory that has been allocated for use as a buffer by a user-level application supported by the second operating system and to, on receiving from the data source a data message of that format, automatically store data of that message in that region of the memory without it passing via the first or second operating systems.

39 Claims, 3 Drawing Sheets

OTHER PUBLICATIONS

The Aloha System, ACM Computer Communication Review, vol. 4 No. 1, F.F. Kuo, Jan. 1974.
A Protocol for Packet Network Intercommunication, IEEE Transactions on Communications, vol. COM-22, No. 5, pp. 637-648, Vinton Cerf, Robert Kahn, May 1974.
Proposal for an International End-to-End Protocol, ACM Computer Communication Review, vol. 6 No. 1, p. 1-18, V. Cerf, et al., Jan. 1976.
Ethernet: distributed packet switching for local computer networks, Communications of the ACM, vol. 19, Issue 7, pp. 395-404, Robert M. Metcalfe and David R. Boggs, Jul. 1976.
Interrupt Driven Programming, Communications of the ACM, vol. 14, No. 6, p. 417-418, Marvin Zelkowits, Jun. 1971.
Synchronizing Processors with Memory-Content-Generated Interrupts, Communications of the ACM, vol. 16, No. 6, p. 350-351, J. Carver Hill, Jun. 1973.
Virtual cut-through: A new computer communication switching technique, Computer Networks, vol. 3, No. 4, pp. 267-286, P. Kermani and L. Kleinrock, Sep. 1979.
An Overview of the New Routing Algorithm for the ARPANET, Proceedings of the 6th Data Communications Symposium, p. 63, John M. McQuillan, et al., Nov. 1979.
Grapevine: An Exercise in Distributed Computing, Communications of the ACM, vol. 25, Issue 4, pp. 260-274, Andrew D. Birrell, et al., Apr. 1982.
The Architecture of the Universe Network, ACM Computer Communication Review, vol. 14, No. 2, pp. 2-9, Ian M. Leslie, et al., Jun. 1984.
Congestion Control in IP/TCP Internetworks, ACM Computer Communication Review, vol. 14, No. 4, p. 11-17, John Nagle, Oct. 1984.
Development of a TCP/IP for the IBM/370, ACM Computer Communication Review, vol. 15, No. 4, Robert M. Brandriff, et al., Sep. 1985.
Supercomputers on the Internet: A Case Study, ACM Computer Communication Review, vol. 17, No. 5, C. Kline, Aug. 1987.
Fragmentation Considered Harmful, ACM Computer Communication Review, vol. 17, No. 5, pp. 390-401, Christopher A. Kent, Jeffrey C. Mogul, Oct. 1987.
An Analysis of Memnet: An Experiment in High-Speed Shared-Memory Local Networking, ACM Computer Communication Review, vol. 18, No. 4, p. 165-174, Gary S. Delp, et al., Aug. 1988.
Measured Capacity of an Ethernet: Myths and Reality, ACM Computer Communication Review, vol. 18, No. 4, p. 222-234, David R. Boggs, et al., Aug. 1988.
The VMP Network Adapter Board (NAB): High-Performance Network Communication for Multiprocessors, ACM Computer Communication Review, vol. 18, No. 4, p. 175-187, H. Kanakia and D. Cheriton, Aug. 1988.
Congestion Avoidance and Control, ACM Computer Communication Review, vol. 18, No. 4, p. 314-329, V. Jacobson, Aug. 1988.
The Design Philosophy of the DARPA Internet Protocols, ACM Computer Communication Review, vol. 18, No. 4, pp. 106-114, David D. Clark, Aug. 1988.
Development of the Domain Name System, ACM Computer Communication Review, vol. 18, No. 4, pp. 123-133, Paul V. Mockapetris and Kevin J. Dunlap, Aug. 1988.
Performance Comparison of the Cray-2 and Cray X-MP/416 Supercomputers, Proceedings of the 1988 ACM/IEEE conference on Supercomputing, p. 288-295, Orlando, Florida, Margaret L. Simmons and Harvey J. Wasserman, Nov. 12, 1988.
Implementing TCP/IP on a Cray computer, ACM Computer Communication Review, vol. 19, No. 2, p. 11-15, David A. Borman, Apr. 1989.
Computing the Internet Checksum, ACM Computer Communication Review, vol. 19, No. 2, p. 86-94, R. Braden, et al., Apr. 1989.
An Analysis of TCP Processing Overhead, IEEE Communications Magazine, vol. 27, No. 6, pp. 23-29, David D. Clark, et al., Jun. 1989.
Sirpent: a High-Performance Internetworking Approach, ACM Computer Communication Review, vol. 19, No. 4, p. 158-169, David R. Cheriton, Sep. 1989.
Protocol Design for High Speed Networks, PhD Thesis, University of Cambridge, Derek Robert McAuley, Sep. 1989.
How Slow Is One Gigabit Per Second?, ACM Computer Communication Review, vol. 20, No. 1, p. 44-53, Craig Partridge, Jan. 1990.
Architectural Considerations for a New Generation of Protocols, ACM Computer Communication Review, vol. 20, No. 4, pp. 200-208, D. D. Clark and D. L. Tennenhouse, Sep. 1990.
Protocol Implementation on the Nectar Communication Processor, ACM Computer Communication Review, vol. 20, No. 4, p. 135-144, Eric C. Cooper, et al., Sep. 1990.
A Host-Network Interface Architecture for ATM, ACM Computer Communication Review, vol. 21, No. 4, Bruce S. Davie, Sep. 1991.
A High-Performance Host Interface for ATM Networks, ACM Computer Communication Review, vol. 21, No. 4, p. 317-325, C. Brendan S. Traw, Sep. 1991.
Fairisle: An ATM Network for the Local Area, ACM Computer Communication Review, vol. 21, No. 4, p. 327, Ian Leslie and Derek R. McAuley, Sep. 1991.
The Desk Area Network, ACM Operating Systems Review, vol. 25, Issue 4, p. 14-21, Mark Hayter and Derek McAuley, Oct. 1991.
An Integration of Network Communication with Workstation Architecture, ACM Computer Communication Review, vol. 21, No. 5, p. 18-29, 1991.
The Evolution of XTP, Proceedings of the Third International Conference on High Speed Networking,. Greg Chesson. Nov. 1991.
System support for multi-service traffic, University of Cambridge Computer Laboratory Technical Report No. 245, Michael J. Dixon, Jan. 1992.
ATOMIC: A Local Communication Network Created Through Repeated Application of Multicomputing Components, Made available by authors, Danny Cohen, Gregory Finn, Robert Felderman, Annette DeSchon, Jan. 10, 1992.
Message Authentication with One-Way Hash Functions, ACM Computer Communication Review, vol. 22, No. 5, pp. 29-38, Gene Tsudik, Oct. 1992.
Analyzing Communication Latency using the Nectar Communication Processor, ACM Computer Communication Review, vol. 22, No. 4, Peter Steenkiste, Oct. 1992.
Efficient Demultiplexing of Incoming TCP Packets, ACM Computer Communication Review, vol. 22, No. 4, Paul E. McKenney and Ken F. Dove, Oct. 1992.
TCP/IP on the Parallel Protocol Engine, Proceedings of the IFIP TC6/WG6.4 Fourth International Conference on High Performance Networking IV, Erich Ruetsche and Matthias Kaiserswerth, Dec. 14, 1992.
Hardware/Software organization of a high performance ATM host interface, IEEE Journal on Selected Areas in Communications, pp. 240-253, C. Traw and J. Smith, Feb. 1993.
The Architecture of Gb/s Multimedia Protocol Adapter, ACM Computer Communication Review, vol. 23, No. 3, E. Ruetsche, Jul. 1993.
Giving Applications Access to Gb/s Networking, IEEE Network, vol. 7, Issue 4, pp. 44-52, Jonathan M. Smith and C. Brendan S. Traw, Jul. 1993.
The Design and Evaluation of an Off-Host Communications Protocol Architecture, MSci Thesis, University of Virginia, Jeffrey R. Michel, Aug. 1993.
A Workstation Architecture to Support Multimedia, PhD Thesis, University of Cambridge, Mark David Hayter, Sep. 1993.
The Importance of Non-Data Touching Processing Overheads in TCP/IP, ACM Computer Communication Review, vol. 23, No. 4, pp. 259-268, Jonathan Kay and Joseph Pasquale, Oct. 1993.
On the Self-Similar Nature of Ethernet Traffic, ACM Computer Communication Review, vol. 23, No. 4, p. 85-95, W. E. Leland, et al., Oct. 1993.
Implementing Network Protocols at User Level, ACM Computer Communication Review, vol. 23, No. 4, C. A. Thekkath, et al., Oct. 1993.
A Programmable HIPPI Interface for a Graphics Supercomputer, Proceedings of the 1993 ACM/IEEE conference on Supercomputing, p. 452-461, Portland, Oregon, Raj K. Singh, et al., Nov. 15, 1993.
Fbufs: A High-Bandwidth Cross-Domain Transfer Facility, ACM Operating Systems Review, vol. 27, Issue 5, p. 189-202, Peter Druschel and Larry L. Peterson, Dec. 1993.

The Parallel Protocol Engine, IEEE/ACM Transactions on Networking, vol. 1, No. 6, p. 650-663, Matthias Kaiserswerth, Dec. 1993.
Protocol Service Decomposition for High-Performance Networking, ACM Operating Systems Review, vol. 27, Issue 5, p. 244-255, Chris Maeda, Brian Bershad, Dec. 1993.
ETA: Experience with an Intel Xeon Processor as a Packet Processing Engine, IEEE Micro, vol. 24, No. 1, p. 24-31, Greg Regnier, et al., Jan. 1994.
A Simple LAN Performance Measure, ACM Computer Communication Review, vol. 24, No. 1, pp. 7-11, J. Vis, Jan. 1994.
ATOMIC: A High-Speed Local Communication Architecture, Journal of High Speed Networks, Danny Cohen, Gregory Finn, Robert Felderman, and Annette DeSchon, Jan. 3, 1994.
Netstation Architecture Multi-Gigabit Workstation Network Fabric, Proceedings of InterOp '94, Las Vegas, Nevada, Gregory G. Finn and Paul Mockapetris, May 1994.
The Medusa Applications Environment, Proceedings of the International Conference on Multimedia Computing and Systems, p. 265-273, Boston, Stuart Wray, et al., May 1994.
MPI: A Message-Passing Interface Standard, Message-Passing Interface Forum, University of Tennessee, Knoxville, Various forum members, May 5, 1994.
A Programmable Network Interface for a Message-Based Multicomputer, ACM Computer Communication Review, vol. 24, No. 3, p. 817, Raj K. Singh, et al., Jul. 1994.
Experiences with a High-Speed Network Adaptor: A Software Perspective, ACM Computer Communication Review, vol. 24, No. 4, P. Druschel, et al., Oct. 1994.
TCP and Explicit Congestion Notification, ACM, ACM Computer Communication Review, vol. 24, No. 5, p. 8-23, Sally Floyd, Oct. 1994.
User-Space Protocols Deliver High Performance to Applications on a Low-Cost Gb/s LAN, ACM Computer Communication Review, vol. 24, No. 4, pp. 14-23, A. Edwards, et al., Oct. 1994.
TCP Vegas: New Techniques for Congestion Detection and Avoidance, ACM Computer Communication Review, vol. 24, No. 4, p. 24-35, L. S. Brakmo, et al., Oct. 1994.
The Dynamics of TCP Traffic over ATM Networks, ACM Computer Communication Review, vol. 24, No. 4, p. 79-88, A. Romanow and S. Floyd, Oct. 1994.
Experiences of Building an ATM Switch for the Local Area, ACM Computer Communication Review, vol. 24, No. 4, p. 158-167, R. J. Black, I. Leslie, and D. McAuley, Oct. 1994.
Application-Specific Protocols for User-Level Shared Memory, Proceedings of the 1994 conference on Supercomputing, pp. 380-389, Washington D.C., Babak Falsafi, et al., Nov. 14, 1994.
Performance of High-Speed Network I/O Subsystems: Case Study of a Fibre Channel Network, Proceedings of the 1994 conference on Supercomputing, Washington D.C., Mengjou Lin, et al., Nov. 14, 1994.
Myrinet: A Gigabit-per-Second Local-Area Network, Draft of paper published in IEEE Micro, vol. 15, No. 1, pp. 29-36, Nanette J. Boden, et al., Nov. 16, 1994.
Beowolf: A Parallel Workstation for Scientific Computation, Proceedings of the 24th International Conference on Parallel Processing, pp. 11-14, Thomas Sterling, et al., Aug. 1995.
Software Support for Outboard Buffering and Checksumming, ACM Computer Communication Review, vol. 25, No. 4, p. 87-98, K. Kleinpaste, P. Steenkiste, B. Zill., Oct. 1995.
Performance of Checksums and CRCS over Real Data, ACM Computer Communication Review, vol. 25, No. 4, p. 68-76, C. Partridge, J. Hughes, and J. Stone, Oct. 1995.
Experiences Implementing a High-Performance TCP in User-Space, ACM Computer Communication Review, vol. 25, No. 4, A. Edward and S. Muir, Oct. 1995.
The Case for Persistent-Connection HTTP, ACM Computer Communication Review, vol. 25, No. 4, J. C. Mogul, Oct. 1995.
U-Net: A User-Level Network Interface for Parallel and Distributed Computing, ACM Operating Systems Review, vol. 29, Issue 5, p. 109-126, Thorsten von Eicken, et al., Dec. 1995.
Towards an Active Network Architecture, ACM Computer Communication Review, vol. 26, No. 2, pp. 15-20, D. L. Tennenhouse, and D. J. Wetherall, Apr. 1996.

Devices in a Multi-Service Operating System, PhD Thesis, University of Cambridge, Paul Ronald Barham, Jul. 1996.
Low-Latency Communication on the IBM RISC System/6000 SP, Gigabit Networking Workshop '97 Meeting, Kobe, Japan, Chi-Chao Chang, et al., Nov. 17, 1996.
Experiences with a Production Gigabit LAN, Gigabit Networking Workshop '97 Meeting, Kobe, Japan, Joe Touch, et al., Apr. 1997.
Host-based Routing Using Peer DMA, Gigabit Networking Workshop '97 Meeting, Kobe, Japan, Joe Touch, et al., Apr. 1997.
Report on the 5th IFIP Internation Workshop on Quality of Service (IWQOS 97), ACM Computer Communication Review, vol. 27, No. 3, pp. 100-117, O. Angin, et al., Jul. 1997.
Firefly: a Multiprocessor Workstation, ACM Operating Systems Review, vol. 21, Issue 4, p. 164-172, Charles P. Thacker and Lawrence C. Stewart, Oct. 1997.
Performance of the CRAY T3E Multiprocessor, Proceedings of the 1997 ACM/IEEE conference on Supercomputing, p. 1-17, San Jose, California, Ed Anderson, et al., Nov. 16, 1997.
Performance Evaluation of the SGI Origin2000: A Memory-Centric Characterization of LANL ASCI Applications, Proceedings of the 1997 ACM/IEEE conference on Supercomputing, p. 1-11, San Jose, California, Harvey J. Wassermann, et al., Nov. 16, 1997.
An Implementation and Analysis of the Virtual Interface Architecture, Proceedings of the 1998 ACM/IEEE conference on Supercomputing, p. 1-15, Orlando, Florida, Philip Buonadonna, et al., Nov. 7, 1998.
MPI-StarT: Delivering Network Performance to Numerical Applications, Proceedings of the 1998 ACM/IEEE conference on Supercomputing, p. 1-15, Orlando, Florida, Parry Husbands and James C. Hoe, Nov. 7, 1998.
Avalon: An Alpha/Linux Cluster Achieves 10 Gflops for $150k, Proceedings of the 1998 ACM/IEEE conference on Supercomputing, Orlando, Florida, Michael S. Warren, et al., Nov. 7, 1998.
Scaling of Beowulf-class Distributed Systems, Proceedings of the 1998 ACM/IEEE conference on Supercomputing, Orlando, Florida, John Salmon, et al., Nov. 7, 1998.
StarT-Voyager: A Flexible Platform for Exploring Scalable SMP Issues, Proceedings of the 1998 ACM/IEEE conference on Supercomputing, Orlando, Florida, Boon S. Ang, et al., Nov. 7, 1998.
Enhancing Distributed Systems with Low-Latency Networking, Parallel and Distributed Computing and Networks, Brisbane, Australia, S. L. Pope, et al., Dec. 1998.
Internet Vulnerabilities Related to TCP/IP and T/TCP, ACM Computer Communication Review, vol. 29, No. 1, pp. 81-85, M. de Vivo, et al., Jan. 1999.
TCP Byte Counting Refinements, ACM Computer Communication Review, vol. 29, No. 3, M. Allman, Jul. 1999.
Piglet: A Low-Intrusion Vertical Operating System, Technical Report MS-CIS-00-04, University of Pennsylvania, Steve Muir and Jonathan Smith, Jan. 2000.
Characterizing Processor Architectures for Programmable Network Interfaces, Proceedings of the 14th international conference on Supercomputing, pp. 54-65, Santa Fe, New Mexico, Patrick Crowley, et al., May 8, 2000.
When the CRC and TCP Checksum Disagree, ACM Computer Communication Review, vol. 30, No. 4, pp. 309-319, Jonathan Stone and Craig Partridge, Oct. 2000.
The Failure of TCP in High-Performance Computational Grids, Proceedings of the 2000 ACM/IEEE conference on Supercomputing, Dallas, Texas, W. Feng and P. Tinnakornsrisuphap, Nov. 4, 2000.
Architectural and Performance Evaluation of GigaNet and Myrinet Interconnects on Clusters of Small-Scale SMP Servers, Proceedings of the 2000 ACM/IEEE conference on Supercomputing, Dallas, Texas, Jenwei Hsieh, et al., Nov. 4, 2000.
Arsenic: A User-Accessible Gigabit Ethernet Interface, Proceedings of IEEE Infocom 2001, pp. 67-76, Ian Pratt and Keir Fraser, Apr. 22, 2001.
Deferred Segmentation for Wire-Speed Transmission of Large TCP Frames over Standard GbE Networks, Proceedings of the 9th Symposium on High Performance Interconnects, pp. 81, Bilic Hrvoye, et al., Aug. 22, 2001.
Presentation given at HOTT01, 9th Symposium on High Performance Interconnects, Bilic Hrvoye, et al., Aug. 22, 2001.

Topology Discovery for Large Ethernet Networks, ACM Computer Communication Review, vol. 31, No. 4, Bruce Lowekamp, et al., Oct. 2001.
EMP: Zero-copy OX-bypass NIC-driven Gigabit Ethernet Message Passing, Proceedings of the 2001 ACM/IEEE conference on Supercomputing, pp. 57, Denver, Piyush Shivam, et al., Nov. 10, 2001.
A Case Study in Application I/O on Linux Clusters, Proceedings of the 2001 ACM/IEEE conference on Supercomputing, pp. 11, Denver, Robert Ross, et al., Nov. 10, 2001.
On Making TCP More Robust to Packet Reordering, ACM Computer Communication Review, vol. 32, No. 1, E. Blanton and M. Allman, Jan. 2002.
TCP Servers: Offloading TCP Processing in Internet Servers. Design, Implementation, and Performance, Technical Report DCR-TR-481, Computer Science Department, Rutgers University, Murali Rangarajan, et al., Mar. 2002.
ATM: A Retrospective on Systems Legacy, ACM Computer Communication Review, vol. 32, No. 5, Jon Crowcroft and Derek McAuley, Nov. 2002.
A Retrospective View of ATM, ACM Computer Communication Review, vol. 32, No. 5, pp. 13-19, Charles Kalmanek, Nov. 2002.
The Influence of ATM on Operating Systems, ACM Computer Communication Review, vol. 32, No. 5, pp. 29-37, Jonathan Smith, Nov. 2002.
An Overview of the BlueGene/L Supercomputer, Proceedings of the 2002 ACM/IEEE conference on Supercomputing, pp. 1-22, Baltimore, NR Adiga, et al., Nov. 16, 2002.
Ultra-High Performance Communication with MPI and the Sun Fire Link Interconnect, Proceedings of the 2002 ACM/IEEE conference on Supercomputing, p. 1-15, Baltimore, Steven J. Sistare and Christopher J. Jackson, Nov. 16, 2002.
Some Internet Architectural Guidelines and Philosophy, IETF Network Working Group, Request for Comments: 3439, R. Bush, D. Meyer, Dec. 2002.
F-RTO: An Enhanced Recovery Algorithm for TCP Retransmission Timeouts, ACM Computer Communication Review, vol. 33, No. 2, Pasi Sarolahti, et al., Apr. 2003.
Scalable TCP: Improving Performance in Highspeed Wide Area Networks, ACM Computer Communication Review, vol. 33, No. 2, pp. 83-91, Tom Kelly, Apr. 2003.
TCP offload is a dumb idea whose time has come, Proceedings of HotOS IX: The 9th Workshop on Hot Topics in Operating Systems, pp. 25-30, Jeffrey C. Mogul, May 18, 2003.
A case for Virtual Channel Processors, Proceedings of the ACM SIGCOMM 2003 Workshops, Derek McAuley and Rolf Neugebauer, Aug. 2003.
Initial End-to-End Performance Evaluation of 10-Gigabit Ethernet, Proceedings of the 11th Symposium on High Performance Interconnects, Justin Hurwitz and Wu-chun Feng, Aug. 20, 2003.
Workshop on network-I/O convergence: experience, lessons, implications (NICELI), ACM Computer Communication Review, vol. 33, No. 5, Vinay Aggarwal, et al., Oct. 2003.
Optimizing 10-Gigabit Ethernet for Networks of Workstations, Clusters, and Grids: A Case Study, Proceedings of the 2003 ACM/IEEE conference on Supercomputing, Phoenix, Arizona, Wu-chun Feng, et al., Nov. 15, 2003.
Performance Comparison of MPI Implementations over InfiniBand, Myrinet and Quadrics, Proceedings of the 2003 ACM/IEEE conference on Supercomputing, Phoenix, Arizona, Jiuxing Liu, et al., Nov. 15, 2003.
Architectural Characterization of TCP/IP Packet Processing on the Pentium M Processor, Proceedings of the 10th International Symposium on High Performance Computer Architecture, pp. 152, Srihari Makineni and Ravi Iyer, Feb. 14, 2004.
FAST TCP: Motivation, Architecture, Algorithms, Performance, Proceedings of IEEE Infocom, pp. 1246-1259, Cheng Jin, et al., Mar. 7, 2004.
TCP Offload to the Rescue, ACM Queue, vol. 2, No. 3, Andy Currid, May 1, 2004.
TCP Onloading for Data Center Servers, Computer, IEEE Computer Society, vol. 37, No. 11, pp. 48-58, Greg Regnier, et al., Nov. 2004.
Declaration of Dr Gregory L Chesson in *Alacritech v. Microsoft*, United States District Court, Northern District California, San Francisco Division, Gregory L. Chesson, Feb. 4, 2005.
Computing Research: A Looming Crisis, ACM Computer Communication Review, vol. 35, No. 2, Edward D. Lazowska and David A. Patterson, Jul. 2005.
Performance Characterization of a 10-Gigabit Ethernet TOE, Proceedings of the 13th Symposium on High Performance Interconnects, W. Feng, et al., Aug. 17, 2005.
User-level device drivers: Achieved performance, J. Comput. Sci. & Technol., vol. 20, B. Leslie, et al., Sep. 2005.
Head-to-Toe Evaluation of High-Performance Sockets Over Protocol Offload Engines, Proceedings of the IEEE International Conference on Cluster Computing, P. Balaji, et al., Sep. 2005.
SCTP versus TCP for MPI, Proceedings of the 2005 ACM/IEEE conference on Supercomputing, Seattle, p. 30, Washington, Humaira Kamal, et al., Nov. 12, 2005.
LTCP: Improving the Performance of TCP in Highspeed Networks, ACM Computer Communication Review, vol. 36, No. 1, pp. 41-50, Sumitha Bhandarkar, et al., Jan. 2006.
Zero-Copy TCP in Solaris, Proceedings of the USENIX Annual Technical Conference, H. K. Jerry Chu, Jan. 1996.
Reflections on Network Architecture: an Active Networking Perspective, ACM Computer Communication Review, vol. 36, No. 2, pp. 27-30, Ken Calvert, Apr. 2006.
10 Networking Papers: Recommended Reading, ACM Computer Communication Review, vol. 36, No. 2, pp. 51-52, Jon Crowcroft, Apr. 2006.
Flow labelled IP over ATM: design and rationale, ACM Computer Communication Review, vol. 36, No. 3, pp. 79-92, Greg Minshall, et al., Jul. 2006.
10 Networking Papers: Readings for Protocol Design, ACM Computer Communication Review, vol. 36, No. 3, pp. 77-78, David Wetherall, Jul. 2006.
A Critique of RDMA, HPCWire article: http://www.hpcwire.com/features/17886984.html,Patrick Geoffray, Aug. 18, 2006.
The NE010 iWARP Adapter, Open Fabrics Alliance, Gary Montry, May 2006.
Thoughts about TCP Offloading, My 2003 HotOS paper title: TCP Offload is a dumd idea whose time has to come, HP Labs (Not speaking for HP), Jeff Mogul, Aug. 2006.
Protocol Offloading vs. Onloading in High Performance Networks, Hot Interconnect Panel, System Interconnect Group, Qlogic Corporation, Lloyd Dickman CTO, Aug. 23, 2006.
Protocol off-loading vs. on-loading in high performance networks, Hot Interconnects, Myricom®, Patrick Geoffray, 2006.
Quantifying the Potential Benefit of Overlapping Communication and Computation in Large-Scale Scientific Applications, Proceedings of the 2006 ACM/IEEE conference on Supercomputing, Tampa, Florida, Jose Carlos Sancho, et al., Nov. 11, 2006.
High-Performance and Scalable MPI over InfiniBand with Reduced Memory Usage: An In-Depth Performance Analysis, Proceedings of the 2006 ACM/IEEE conference on Supercomputing, Tampa, Florida, Sayantan Sur, et al., Nov. 11, 2006.
10Gb/s Ethernet Performance and Retrospective, ACM Computer Communication Review, vol. 37, No. 2, pp. 89-92, Steven Pope and David Riddoch, Mar. 19, 2007.
Getting 10 Gb/s from Xen, Euro-Par Conference 2007, pp. 224-233, Rennes, France, Kieran Mansley, et al., Aug. 28, 2007.
The Parallel Protocol Engine, IEEE/ACM Transactions in Networking vol. 1, Issue 6, pp. 650-663, M. Kaiserswerth, Dec. 1993.
Use of message-based multicomputer components to construct gigabit networks, ACM Computer Communication Review, vol. 23, No. 4, p. 32-44, Danny Cohen, et al., Jul. 1993.
The End of History, IEEE TCGN Gigabit Networking Workshop, J. Evans and T. Buller, Apr. 22, 2001.
The Cambridge Model Distributed System, ACM SIGOPS Operating Systems Review, vol. 14, Issue 1, pp. 21-29, M.V. Wilkes and R.M. Needham, Jan. 1980.

* cited by examiner

PROCESSING RECEIVED DATA

PRIOR APPLICATION DATA

This application claims priority to PCT Application No. PCT/GB2006/004946, entitled Processing Received Data, filed Dec. 28, 2006, which was published as WO 2007/074343 which is based on and claims priority to Great Britain Patent Application No. 0600417.0, filed Jan. 10, 2006.

BACKGROUND OF THE INVENTION

1. Field of the Invention

The invention relates to supporting virtual instances of data processing entities, particularly hardware devices.

2. Related Art

It is normal for a computer to have just a single operating system (OS) running at any one time. That operating system provides support to one or more user-level applications running on the computer. The support provided by the operating system typically includes providing the applications with protocols whereby the applications can communicate with hardware components of the computer. Those components could include input/output (I/O) devices such as a keyboard, a display or a network interface. The protocols can be provided in the form of libraries of procedures that can be called by the applications and which, when executed, communicate with the hardware in the desired way.

When a computer runs multiple operating systems at the same time each operating system functions independently of the others, so a hypervisor is used to manage the operating systems' interaction with hardware components of the computer. The hypervisor performs functions such as scheduling the operations of each operating system and ensuring that when the hardware needs to communicate with a particular one of the operating systems its messages are directed correctly. The latter occurs frequently when hardware, such as a network interface, receives data. Efficiency improvements in processing received data in multi-operating system environments are thus highly advantageous. Therefore, what is desired and provided herein is an improved way of arranging an interface to receive and direct incoming data.

SUMMARY OF THE INVENTION

According to one aspect of the present invention there is provided a computer system comprising hardware including a data interface for interfacing between the computer system and a data source; a memory; a first operating system capable of communicating with the hardware; and a second operating system capable of supporting a user-level application and being configured to communicate with the hardware via the first operating system, the second operating system being capable of allocating a region of the memory for use as a buffer by such a user-level application; wherein the data interface is configurable to associate a predetermined data format with a region of the memory that has been allocated for use as a buffer by a user-level application supported by the second operating system so as to, on subsequently receiving from the data source a data message of that format, automatically store data of that message in that region of the memory without it passing via the first or second operating systems.

According to a second aspect of the present invention there is provided a computer system comprising hardware including a data interface for interfacing between the computer system and a data source; a memory; a first operating system capable of communicating with the hardware; and a second operating system capable of supporting a user-level application; wherein at least one of the first and second operating systems is arranged to detect that data of a first data message received by the data interface from the data source has been directed to a destination via the first operating system, and in response to detecting that to configure the data interface to direct data of subsequent data messages having a data format in common with the first data message to that destination without it passing via the second operating system.

According to a third aspect of the present invention there is provided a data interface that is capable of operation in a computer system according to the first or second aspects of the present invention. Such a data interface is preferably configurable to associate a predetermined data format with a region of the memory of the computer system external to the data interface that has been allocated for use as a buffer by a user-level application supported by the second operating system so as to, on subsequently receiving from the data source a data message of that format, automatically store data of that message in that region of the memory without it passing via the first or second operating systems.

According to a fourth aspect of the present invention there is provided a computer program for acting as a driver for communicating with a data interface in a computer system according to the first or second aspects of the present invention. Preferably the computer program is such as to provide an operating system with functionality to, in response to detection in response to detection that data of a first data message received by the data interface from the data source has been directed to a destination via another operating system, configure the data interface to direct data of subsequent data messages having a data format in common with the first data message to that destination without it passing via the second operating system. The computer program may be stored on a data carrier.

According to a fifth aspect of the present invention there is provided a method for operating a computer system comprising hardware including a data interface for interfacing between the computer system and a data source, a memory, a first operating system capable of communicating with the hardware; and a second operating system capable of supporting a user-level application and being configured to communicate with the hardware via the first operating system, the second operating system being capable of allocating a region of the memory for use as a buffer by such a user-level application; the method comprising: configuring the data interface to associate a predetermined data format with a region of the memory that has been allocated for use as a buffer by a user-level application supported by the second operating system; and the data interface on subsequently receiving from the data source a data message of that format, automatically storing data of that message in that region of the memory without it passing via the first or second operating systems.

According to a sixth aspect of the present invention there is provided a method for operating a computer system comprising: hardware including a data interface for interfacing between the computer system and a data source; a memory; a first operating system capable of communicating with the hardware; and a second operating system capable of supporting a user-level application; the method comprising: detecting by means of at least one of the first and second operating systems that data of a first data message received by the data interface from the data source has been directed to a destination via the first operating system; and in response to detecting that configuring the data interface by means of that operating system to direct data of subsequent data messages having a data format in common with the first data message to that destination without it passing via the second operating system.

In one embodiment, the first operating system is configured to serve as an interface between multiple further operating systems and the hardware. For example, the first operating system may be a hypervisor while the second operating system may be an operating system that provides direct application support, such as Windows or Linux.

The data interface may be a network interface and the data source may be a data network. In one embodiment, the data interface has access to a data store for storing a plurality of indications of respective data formats and corresponding to each one an indication of a destination, and the data interface is arranged to, on receiving a data message from the data source identify whether the format of the data message matches a data format an indication of which is stored in the data store, and if it does to pass data of that message to that destination. It is noted that the data message may be a data packet.

The data format may be at least partially defined by a destination address such as an internet layer address or an internet protocol address. The data format may be at least partially defined by a data port, such as a TCP port.

In one embodiment, the data interface is configurable automatically by the first operating system to associate the predetermined data format with the region of the memory that has been allocated for use as a buffer by a user-level application supported by the second operating system. It is contemplated that the data interface may be configurable automatically by the second operating system to associate the predetermined data format with the region of the memory that has been allocated for use as a buffer by a user-level application supported by the second operating system as well.

Generally, the data interface is arranged to, on receiving a data message from the data source identify whether it is configured to associate the format of that message with a region of the memory and if it has to automatically store data of that message in that region of the memory without it passing via the first or second operating systems.

The first operating system, the second operating system or the data interface may be arranged to deconfigure the data interface from associating a message format with a region of the memory when a pre-set time has elapsed from when the interface was configured to associate that message format with that region of the memory. In addition, the first operating system, the second operating system or the data interface may be arranged to deconfigure the data interface from associating a message format with a region of the memory in response to sensing that data traffic conditions match one or more predefined criteria. The said traffic criteria may include the criterion that the flow of received data of the message format is below a pre-set amount in a pre-set time.

In one embodiment, the second operating system is arranged to perform the step of configuring the data interface to direct data of subsequent data messages having a data format in common with the first data message only when it detects that the flow of received data of that data format is above a pre-set amount in a pre-set time. The second operating system may also be arranged to perform the step of configuring the data interface to direct data of subsequent data messages having a data format in common with the first data message only for data formats of one or more pre-set types. The said pre-set types may each be defined by respective port numbers or ranges of port numbers.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

It is normal for a computer to have just a single operating system (OS) running at any one time. That operating system provides support to one or more user-level applications running on the computer. The support provided by the operating system typically includes providing the applications with protocols whereby the applications can communicate with hardware components of the computer. Those components could include input/output (I/O) devices such as a keyboard, a display or a network interface. The protocols can be provided in the form of libraries of procedures that can be called by the applications and which, when executed, communicate with the hardware in the desired way.

Figure 1:
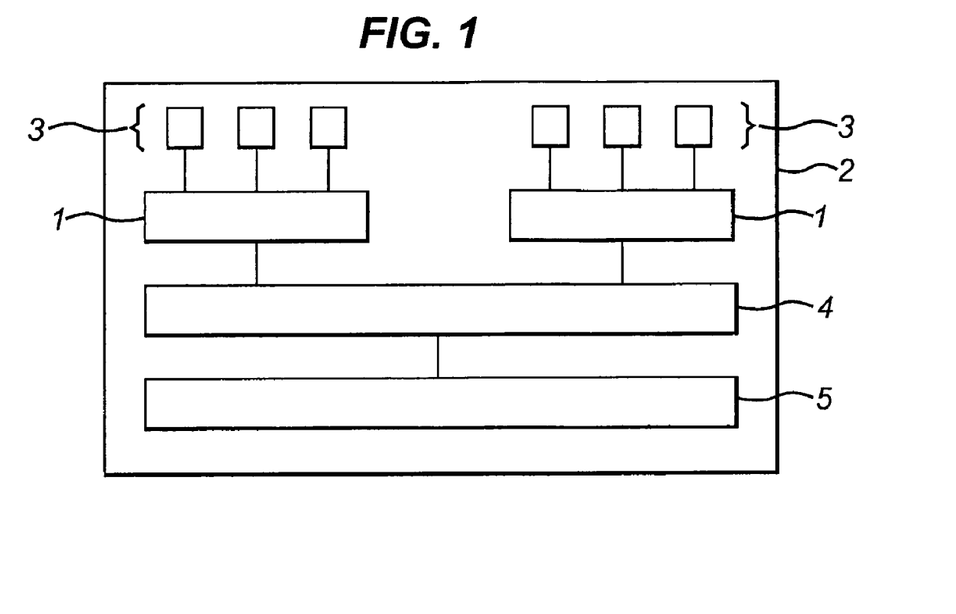
FIG. 1 shows the architecture of a computer system supporting multiple operating systems.

Another arrangement, which is illustrated in FIG. 1, involves running multiple operating systems 1 on a single computer 2. This arrangement has been implemented for example by the IBM 360 and more recently by VMware and Xen. Each operating system supports a respective set of applications 3, which communicate with their operating system in the normal way. Each operating system functions independently of the others, so a supervisory entity or hypervisor 4 is used to manage the operating systems and their interactions with the hardware 5. The hypervisor performs functions such as scheduling the operations of each operating system and ensuring that when the hardware needs to communicate with a particular one of the operating systems its messages are directed correctly. Therefore the hypervisor is itself a form of operating system.

The latter function of the hypervisor is especially significant when the hardware needs to initiate communications with an operating system or even with directly with a user-level entity such as an application. Such communications must be directed to the right one of the operating systems and/or to the right one of the applications. One example of a hardware configuration in which this could arise is the one described in WO 2004/025477. In that configuration the network interface hardware can pass data that has been received over the network to a buffer at its own initiation, rather than having to wait for the operating system or the application to request any received data. The buffer can be owned by the operating system or the application, so the operating system or the application can access the data stored in the buffer.

Figure 2:
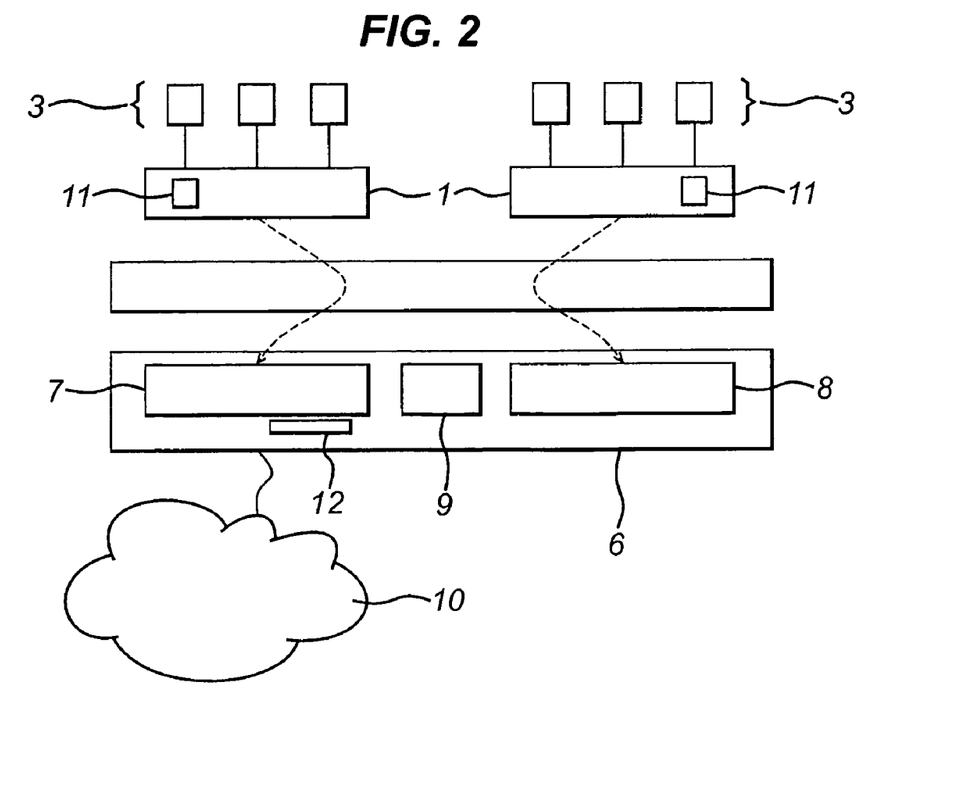
FIG. 2 shows the configuration of a network interface for operation in the system of FIG. 1.

FIG. 2 illustrates the manner in which network hardware is conventionally configured for operation in a system running multiple operating systems. In FIG. 2 like components have the same reference numbers as in FIG. 1. In the arrangement of FIG. 2 the network hardware 6 implements two virtual network interfaces 7 and 8. Each of those virtual interfaces is operated by common hardware components of the network hardware 6, but each has its own state which is stored in a respective region of state memory 9 of the hardware. Included in the state of each virtual network interface is its MAC (medium access control) address, which it uses in the network 10 to which the interface is connected. Each virtual interface has a different MAC address. This allows the network hardware to identify which of the virtual interfaces an incoming packet should be directed to, by means of the MAC address specified in an incoming data packet. For this purpose a filter 12 is implemented in the network hardware. When an incoming packet arrives the filter 12 checks its content, identifies the destination MAC address that it specifies and directs it to the appropriate virtual network interface based on that MAC address. Each operating system 1 has its own instance of a driver 11 for communicating with the respective virtual interface.

WO 2004/025477 describes a network interface that, when implemented on a platform that that has a single operating system and one or more applications, can advantageously deliver data received over the network directly to a buffer owned by the operating system or the application. There may be multiple buffers that are capable of receiving the data. For example, the operating system could have one or more buffers for receiving the data, as could each application. In a typical configuration there could be one buffer allocated for each communication path or channel that is in use. The network card is therefore expected to direct received data to the appropriate one of those buffers. This can be done by the NIC using a look-up table that is pre-configured to store the address of each buffer and the port number associated with that buffer. The NIC can store the virtual interface associated with the host::port information. The data in a received TCP packet contains the host::port information which when looked up determines the virtual interface to which data should be directed. Each virtual interface is associated with a set of buffers and according to information from the recipient application or operating system the NIC is able to determine which of the buffers it should next deliver data into. The network card can then look up the appropriate buffer when data is received on a particular port. Data received on other ports (for example a request from a remote terminal to establish a connection to the local machine) can be sent to a default virtual interface, which is normally associated with the operating system kernel. The kernel can then decide how to handle that data.

When the system described in WO 2004/025477 is implemented on a platform that has multiple operating systems the approach described above cannot be readily implemented. The look-up table does not take account of the MAC address to which data has been directed, so it cannot distinguish between data sent on the same port but to different operating systems or to applications supported by different operating systems. Therefore, the efficiency advantages that stem from filtering and directing incoming data at the network hardware cannot be achieved in that scenario. As will be described further below, the invention herein provides an improved way of arranging an interface to receive and direct incoming data.

In the system to be described below, the network interface is capable of directing received data to a particular receive buffer in dependence on destination information (e.g. MAC address) to which that data has been transmitted. Furthermore, the system is arranged to automatically configure the network interface to direct the data in that way. In a platform that has multiple operating systems managed by a hypervisor, the hypervisor may be arranged to automatically configure the network interface. If the system is para-virtualised then an operating system or a part of it may be arranged to automatically configure the network interface.

NICs conventionally do not support directing incoming traffic to a particular consumer of data based on destination MAC addresses since that is not normally required in a single-operating-system environment. The following description sets out a method by which such NICs can be configured to efficiently support multiple-operating-system environments, and also a method by which enhanced NICs that do support filtering of incoming data based on destination MAC addresses can be configured.

The present example will be described with reference to a network that uses TCP/IP over Ethernet. However, the present invention is not limited to use with these and is applicable to networks that use other protocols.

Figure 3:
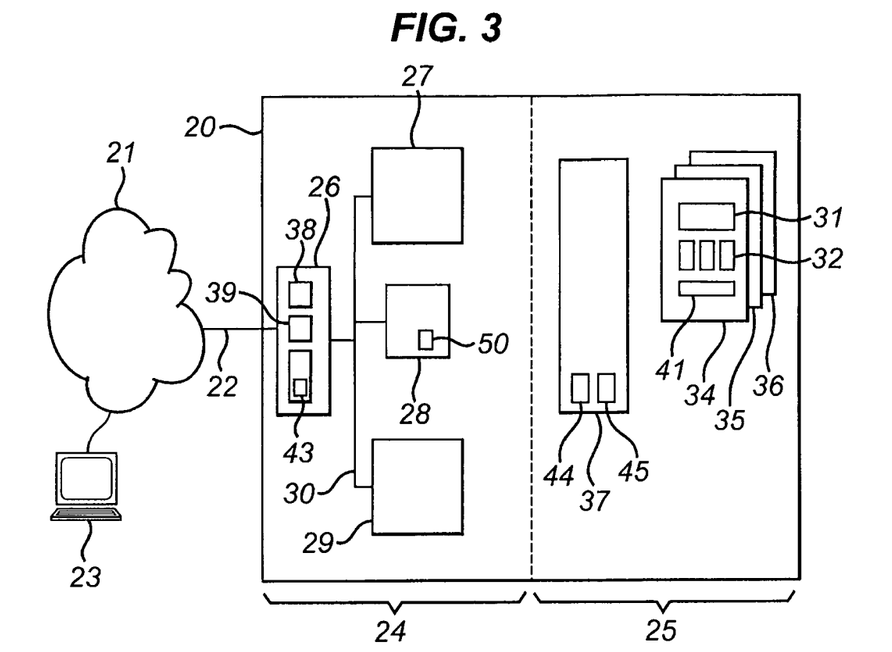
FIG. 3 shows the architecture of a computer system supporting multiple operating systems.

FIG. 3 shows a data processing device 20 connected to a network 21 by a data link 22. A further data processor 23 is also connected to the network and can communicate with the data processor 20 over the network. FIG. 3 illustrates the components of data processor 20 in the hardware domain (24) and the software domain (25). In the hardware domain it comprises a network interface 26, a central processor 27 (e.g. a CPU), a working memory 28 (e.g. RAM) and a program store 29 (e.g. a hard disc). These are interconnected by a bus 30. In the software domain it comprises an operating system 31 and applications 32. These are provided by the execution by processor 27 of suitable program code stored in the program store 29. The operating system supports the applications by, for example, managing the applications' access to hardware components of the system. For this purpose, the operating system includes a set of drivers 33 for communication with the network interface 26. The data processor 20 could be a general-purpose computer.

The operating system 31 and applications 32 are in a first environment 34. In the system illustrated in FIG. 3 multiple such environments are supported, as illustrated at 35 and 36. Each environment has a respective operating system that operates independently of the other operating systems and its own user-level application(s) that operate independently of applications in others of the environments. The operation of the environments is managed by hypervisor 37. The basic functions of the hypervisor could be analogous to those employed in known multi-operating-system arrangements such as IBM 360 or VMware or Xen. The hypervisor interfaces between the operating systems and the hardware so as to allow each operating system to function correctly without conflicting with the other operating systems on the hardware platform 20.

The network interface 26 may be termed a network interface card (NIC). However, it need not take the form of a card. It could be a stand-alone external device or it could be integrated on to a motherboard of the data processor 20 or even integrated into an integrated circuit on which the processor 27 is implemented. The network interface card comprises a processor 38, a program store 39 and a working memory 40. The processor 38 executes code stored in the store 39 to perform networking functions, and uses the memory 40 as a temporary store for incoming or outgoing data, and to store working data such as look-up tables that are configured during operation.

The network interface 26 is capable of automatically delivering received data directly to buffers owned by an intended recipient of the data, for instance to a user-level buffer. The network interface could perform protocol proceeding on received data before storing it in the appropriate buffer. However, it is preferred that protocol processing is performed by the operating system 31 and/or at user level by transport library 41 after the network interface has delivered the data to the appropriate buffer.

Figure 4:
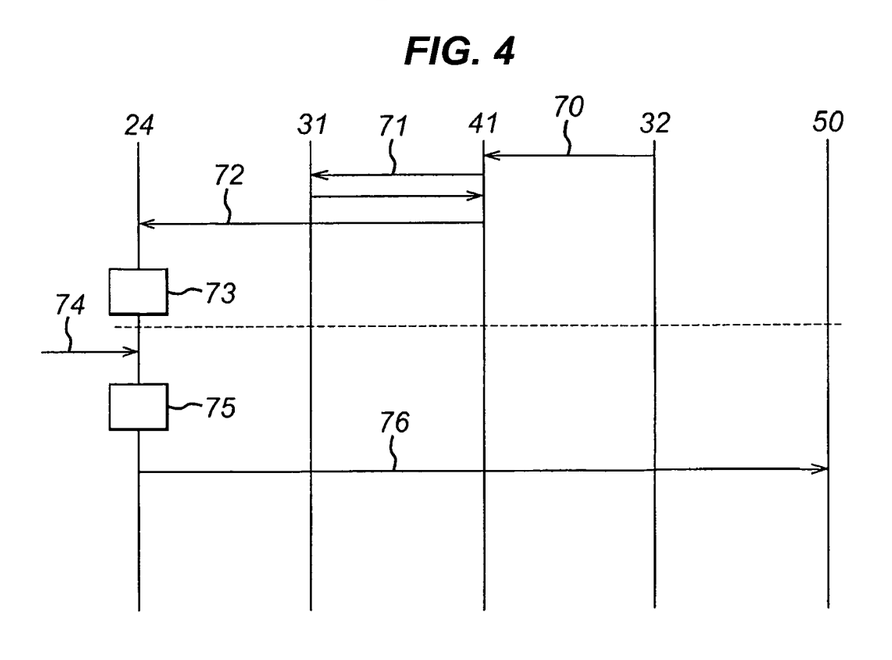
FIGS. 4 to 6 show communication flows in the system of FIG. 3.

The operating system 31, a user-level transport library 41 and the network interface 26 itself can cooperate to configure a table 43 in the network interface so as to cause the network interface to deliver data to a recipient's buffer in a single-operating-system environment. To this end the transport library 41 provides a routine that can be called by any application 32 that wishes to receive data. The process of configuration of table 43 and its use for receiving data in a single-operating system environment are illustrated in FIG. 4. When an application calls the routine in the transport library (step 70) the transport library arranges with the operating system for the allocation of one or more buffers 42 in memory 28 in which received data can be stored (step 71), and transmits a message to the network interface 26 to inform it of the location of the buffer(s) and the TCP port number that will be associated with the buffer(s) (step 72). The TCP port number and/or other address bits of an incoming packet will allow the network interface to identify incoming traffic that is to be directed to the buffer(s). Where more than one contiguous memory buffer is allocated to the application those buffers they form a pool that can be used for receiving incoming data. In the present description data will for simplicity be described as being delivered to a buffer, but in practice it could be delivered to a discontinuous region of memory formed by a pool of buffers, all of which are owned by a particular destination application as a virtual interface. The network interface is informed of the address of the default virtual interface when the system is first configured. The network interface is arranged to, on subsequently receiving such a message, configure a look-up filter table 43 in memory 40 to hold the location of the buffer and the parameters (step 73). In practice the filter table 43 could be split into a first table that maps patterns of address bits to virtual interfaces and a second table that maps virtual interfaces to the physical addresses of the buffers that they are associated with and ownership information indicating which virtual interface has the right to deliver data onto that buffer. When incoming data is received from the network (step 74) the network interface checks its characteristics against the parameters stored in filter table 43 (step 75). If the data matches a set of stored parameters the network interface directs that data to the buffer 50 whose location is stored in association with those parameters (step 76). The network interface is also arranged to direct incoming data that does not match any of the parameters stored in the table to a default location, which is conveniently the operating system in order that the operating system can process that data.

The network interface is capable of operating so as to support multiple MAC addresses, and in a multi-operating-system environment as illustrated in FIG. 3 it operates under the control of the hypervisor to use a different MAC address for communications to or from each operating system. When one of the operating systems begins to request network services the hypervisor allocates a MAC address to that operating system, stores in a table 44 the pairing of that MAC address with that operating system, and instructs the network interface to configure itself to support that additional MAC address. When data is to be transmitted from that operating system the hypervisor instructs the network interface to transmit it from the appropriate MAC address. The hypervisor may also need to instruct the NIC to operate in a "promiscuous" mode, so that it will accept data directed to multiple MAC addresses.

In its default configuration, in order that received data is directed to the appropriate location the network interface forwards received packets to the hypervisor. The hypervisor identifies the destination MAC address in each packet, looks it up in table 44 and forwards the packet to the appropriate operating system. It would be possible for the network interface to be configured to do this. However, this would require the NIC to perform filtering based on the MAC address, which is not desirable. The reason for this is that that capability is not required in a single-OS system, and additionally providing support for choosing a destination based on MAC address would require the table 43 (which is conveniently provided as a content-addressable memory or RAM based hash table) to be larger. This would be expected to make it slower to look up data in the table or to take up excessive amounts of memory on the NIC. Since all incoming traffic is filtered against the filter table 43 it is desirable to keep operation of the table as simple and quick as possible.

Figure 5:
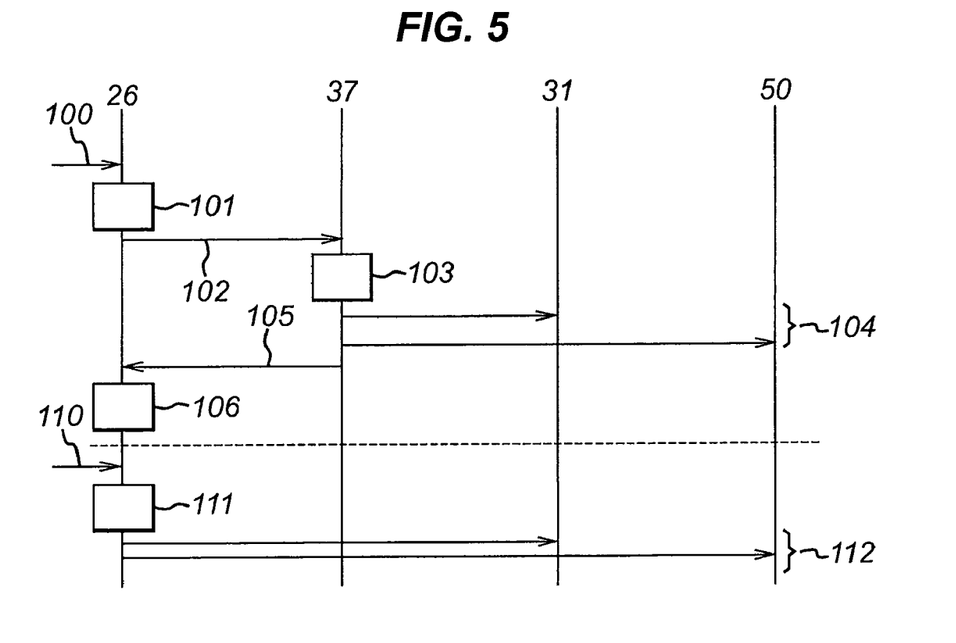
Figure 6:
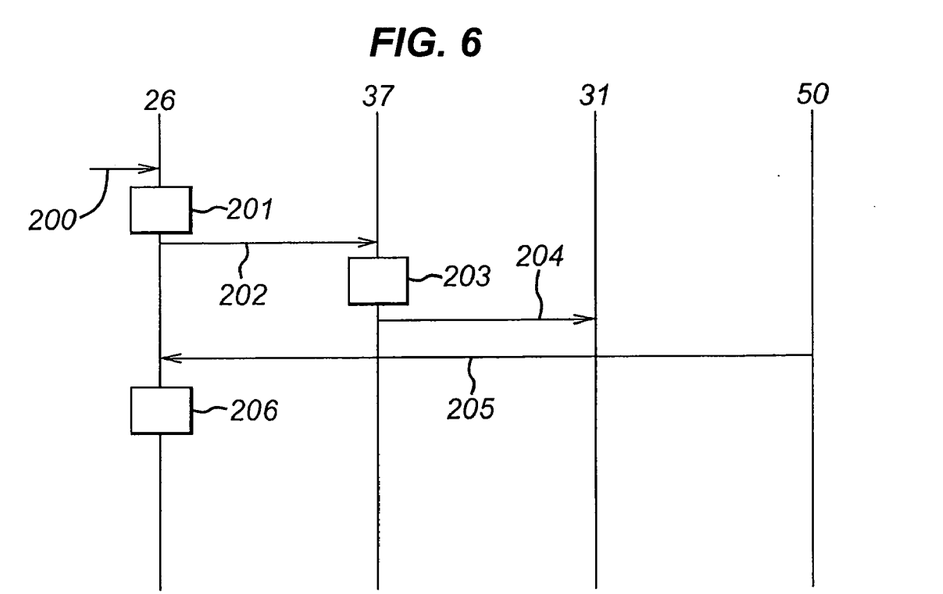

The present system therefore provides other mechanisms for configuring the table 43 in a system such as that of FIG. 3 that has multiple operating systems running side-by-side. These mechanisms are illustrated in FIGS. 5 and 6. In the present system, the network interface can be configured by these mechanisms to direct data directly to the appropriate receive buffer, without the intervention of the hypervisor to route each item of incoming data. This can provide a significant improvement in efficiency, since the amount of processing that the hypervisor is required to perform is significantly reduced.

When the system is fully virtualised the operating systems and the applications are unaware that they are running in a multi-OS environment. In this situation the mechanism of FIG. 5 can be used. In a para-virtualised environment either mechanism can be used.

When an application wishes to be able to receive data it calls the routine in the transport library in the same way as if it were in a single-OS system. The transport library obtains a buffer for the data to be received and signals the hypervisor with the details of the connection (including buffer location and port number) in the way that it would normally signal the network interface in a single-OS system. The hypervisor then stores the filtering parameters (e.g. port number) against the address of the appropriate buffer in a table 45 that is specific to that operating system. The tables 44 and 45 could be integrated with each other. Table 45 may also indicate other locations to which data could be delivered. For example it could indicate a default location for each environment, which could conveniently be the operating system of that environment.

FIG. 5 shows the signalling in one configuration mechanism. In this mechanism the hypervisor is arranged to configure the NIC's filter table 43 when it has to forward received network data to an operating system. Once the table has been appropriately configured, any further data of the same nature can be forwarded by the network interface without the intervention of the hypervisor.

FIG. 5 shows signalling between the network interface 26, the hypervisor 37, an operating system 31 supported by the hypervisor and the buffer 50 of an application running on that operating system. At step 100 a TCP/IP data packet is received by the network interface. The network interface checks whether that packet matches any of the rows in filter table 43 (step 101), and since it does not it forwards the packet to the hypervisor. (Step 102). The hypervisor analyses the packet to identify its destination MAC address and looks that address up in table 44 to identify which of the operating systems it is supporting has been allocated that MAC address. It then looks up in the appropriate one of the tables 45 to identify which destination corresponds to the destination port of the received packet (step 103), and it forwards the packet to that destination (step 104). The destination could be the operating system 31 or a buffer 50. The hypervisor is configured so as to then automatically send a configuration message to the NIC (step 105) to cause the NIC to configure its table 43 so that future packets having the same destination IP address and port as that previously received packet will be forwarded directly by the NIC to that buffer. In response to that message the NIC configures table 43 accordingly (step 106). This will avoid the need for such packets to be handled by the hypervisor, reducing load on the system.

When such a packet is subsequently received (step 110) the NIC checks its details against the filter table 43, finds a match and retrieves the destination stored in the table (step 111) and then automatically forwards the packet to that destination. This subsequent operation bypasses the hypervisor.

The hypervisor may automatically configure the table 43 in this way in response to the need to forward any received packets to a destination. Alternatively, in some situations it may be preferable for it to configure the table only after it has received a predetermined amount of data (e.g. a certain number of incoming packets) to a particular IP address or to a particular combination of IP address and port number.

This first configuration mechanism is transparent to the operating systems and the applications.

The second configuration mechanism can be used if the system is a para-virtualised system: that is one in which entities in one of the environments 34 to 36 can have knowledge of the fact that they are running in a multiple-OS system. In this mechanism the table 43 of the NIC can be configured by one of the operating systems or by an application running on that operating system.

FIG. 6 shows signalling in the second mechanism. At step 200 a TCP/IP data packet is received by the network interface. The network interface fails to match the packet in table 43 (step 201) and forwards it to the hypervisor. (Step 202). The hypervisor analyses the packet to identify its destination MAC address and looks that address up in table 44 to identify which of the operating systems it is supporting has been allocated that MAC address. (Step 202). It then looks up in the tables 44, 45 to identify where to direct the received packet. (Step 203). In this example the table 45 indicates that the packet is to be sent to operating system 31. The hypervisor forwards the packet to that operating system. (Step 204). The operating system processes the packet, for example by storing it so it is accessible by an application or by protocol-processing it. The operating system also sends a configuration message to the NIC (step 205) to cause the NIC to configure its table 43 so that future packets having the same destination IP address and port as that packet will be forwarded directly by the NIC to that operating system or to the appropriate buffer. In response to that message the NIC configures table 43 accordingly (step 206). This will avoid the need for such packets to be handled by the hypervisor, reducing load on the system. Subsequent operation is as in steps 110 to 112 of FIG. 5. In this configuration the transport library is unused.

The operating system 31 may automatically configure the table 43 in this way in response to detecting certain pre-programmed traffic flow conditions. These may include traffic flows greater than a set volume in a set period of time to a particular port. It may advantageously monitor particular port numbers that are known to be used by high-performance applications. Which ports those are will depend on the use to which the host computer is being put. In this way the operating system can arrange for all packets to a particular high-priority application, such as a database application, to be accelerated. Alternatively, in some situations it may be preferable for it to configure the table only after it has received a predetermined amount of data (e.g. a certain number of incoming packets) to a particular IP address or to a particular combination of IP address and port number. It may then automatically deconfigure the table to delete a particular stored combination of data format and buffer address. It may do so in response to detecting conditions such as that the combination has been in place for a pre-set time, or that less data than a set threshold (of data volume or number of packets) has been received in a pre-set time. That threshold may be very low, so that the deconfiguration takes place only if no data of the respective type has been received in a certain time.

Entries in the table 43 may be deleted automatically after a pre-set period of time. This can help to avoid the table 43 growing too large and to take account of the possibility of the destination buffers or IP addresses changing. The hypervisor and/or the operating systems could be configured to signal the NIC to delete entries in the table 43 when they become out-of-date.

The multiple operating systems could be multiple instances of a single type of operating system or they could each be different operating systems.

In the data is preferably received as packets and forwarded in the same packetised form. However, the traffic data could be extracted from received packets by the NIC and forwarded to the hypervisor or elsewhere together with a representation of the routing data (e.g. IP address and port) that is needed for identifying the destination of data. This could involve partial or full protocol processing being performed by the NIC.

The data could be conveyed over the network by a protocol other than TCP/IP over Ethernet. Any suitable networking protocol can be used. Instead of MAC addresses, IP addresses and ports analogous identifiers at similar levels of the protocol that is in use can be employed for identifying the required destination of received data.

The functions performed by the hypervisor or the operating system in the mechanisms illustrated in FIGS. 5 and 6 could be performed by the core (kernel) of the hypervisor or the operating system or by a driver of the hypervisor or operating system that allows it to communicate with the NIC.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A computer system comprising:
    hardware including a data interface for interfacing between the computer system and a data source;
    a memory;
    a first operating system capable of communicating with the hardware; and
    a second operating system capable of supporting a user-level application and being configured to communicate with the hardware via the first operating system, the second operating system being capable of allocating a region of the memory for use as a buffer by such a user-level application;

wherein the data interface is configurable to associate a predetermined data format with a region of the memory that has been allocated for use as a buffer by a user-level application supported by the second operating system so as to, on subsequently receiving from the data source a data message of that format, automatically store data of that message in that region of the memory without it passing via the first or second operating systems.

2. The computer system as claimed in claim 1, wherein the first operating system is capable of serving as an interface between multiple further operating systems and the hardware.

3. The computer system as claimed in claim 2, wherein the first operating system is a hypervisor.

4. The computer system as claimed in any of claim 1, wherein the data interface is a network interface and the data source is a data network.

5. The computer system as claimed in claim 1, wherein the data interface has access to a data store for storing a plurality of indications of respective data formats and corresponding to each one an indication of a destination, and the data interface is arranged to, on receiving a data message from the data source identify whether the format of the data message matches a data format an indication of which is stored in the data store, and if it does to pass data of that message to that destination.

6. The computer system as claimed in claim 1, wherein the data format is at least partially defined by a destination address.

7. The computer system as claimed in claim 6, wherein the address is an internet layer address.

8. The computer system as claimed in claim 7, wherein the address is an internet protocol address.

9. The computer system as claimed in claim 1, wherein the data format is at least partially defined by a data port.

10. The computer system as claimed in claim 1, wherein the data message is a data packet.

11. The computer system as claimed in claim 1 wherein the data interface is configurable automatically by the first operating system to associate the predetermined data format with the region of the memory that has been allocated for use as a buffer by a user-level application supported by the second operating system.

12. The computer system as claimed in claim 1 wherein the data interface is configurable automatically by the second operating system to associate the predetermined data format with the region of the memory that has been allocated for use as a buffer by a user-level application supported by the second operating system.

13. The computer system as claimed in claim 1, wherein the data interface is arranged to, on receiving a data message from the data source, identify whether it is configured to associate the format of that message with a region of the memory and if it has to automatically store data of that message in that region of the memory without it passing via the first or second operating systems.

14. The computer system as claimed in claim 1, wherein one of the first operating system, the second operating system and the data interface is arranged to deconfigure the data interface from associating a message format with a region of the memory when a pre-set time has elapsed from when the interface was configured to associate that message format with that region of the memory.

15. The computer system as claimed in claim 1, wherein one of the first operating system, the second operating system and the data interface is arranged to deconfigure the data interface from associating a message format with a region of the memory in response to sensing that data traffic conditions match one or more predefined criteria.

16. The computer system as claimed in claim 15, wherein the one or more predefined criteria include a criterion that a the flow of received data of the message format is below a pre-set amount in a pre-set time.

17. The computer system as claimed in claim 1, wherein the data interface is configured to associate a predetermined data format with a region of the memory of the computer system external to the data interface that has been allocated for use as a buffer by a user-level application supported by the second operating system so as to, on subsequently receiving from the data source a data message of that format, automatically store data of that message in that region of the memory without it passing via the first or second operating systems.

18. The computer system as claimed in claim 1, further comprising a computer program configured to provide an operating system with functionality to, in response to detection that data of a first data message received by the data interface from the data source has been directed to a destination via another operating system, configure the data interface to direct data of subsequent data messages having a data format in common with the first data message to that destination without it passing via the second operating system.

19. A computer system comprising:
hardware including a data interface for interfacing between the computer system and a data source;
a memory;
a first operating system capable of communicating with the hardware; and
a second operating system capable of supporting a user-level application;
wherein at least one of the first and second operating systems is arranged to detect that data of a first data message received by the data interface from the data source has been directed to a destination via the first operating system, and in response to detecting that to configure the data interface to direct data of subsequent data messages having a data format in common with the first data message to that destination without it passing via the first operating system.

20. The computer system as claimed in claim 19, wherein the first operating system is capable of serving as an interface between multiple further operating systems and the hardware.

21. The computer system as claimed in claim 20, wherein the first operating system is a hypervisor.

22. The computer system as claimed in claim 19, wherein the data interface is a network interface and the data source is a data network.

23. The computer system as claimed in claim 19, wherein the data interface has access to a data store for storing a plurality of indications of respective data formats and corresponding to each one an indication of a destination, and the data interface is arranged to, on receiving a data message from the data source identify whether the format of the data message matches a data format an indication of which is stored in the data store, and if it does to pass data of that message to that destination.

24. The computer system as claimed in claim 19, wherein the data format is at least partially defined by a destination address.

25. The computer system as claimed in claim 24, wherein the address is an internet layer address.

26. The computer system as claimed in claim 25, wherein the address is an internet protocol address.

27. The computer system as claimed in claim 19, wherein the data format is at least partially defined by a data port.

28. The computer system as claimed in claim 19, wherein the data message is a data packet.

29. The computer system as claimed in claim 19, wherein the data interface is arranged to, on receiving a data message from the data source, identify whether it is configured to associate the format of that message with a region of the memory and if it has to automatically store data of that message in that region of the memory without it passing via the first or second operating systems.

30. The computer system as claimed in claim 19, wherein one of the first operating system, the second operating system and the data interface is arranged to deconfigure the data interface from associating a message format with a region of the memory when a pre-set time has elapsed from when the interface was configured to associate that message format with that region of the memory.

31. The computer system as claimed in of claim 19, wherein one of the first operating system, the second operating system and the data interface is arranged to deconfigure the data interface from associating a data format with a region of the memory in response to sensing that data traffic conditions match one or more predefined criteria.

32. The computer system as claimed in claim 31, wherein the said traffic criteria include the criterion that the flow of received data of the data format is below a pre-set amount in a pre-set time.

33. The computer system as claimed in claim 19, wherein the second operating system is arranged to perform the step of configuring the data interface to direct data of subsequent data messages having a data format in common with the first data message only when it detects that the flow of received data of that data format is above a pre-set amount in a pre-set time.

34. The computer system as claimed in claim 19, wherein the second operating system is arranged to perform the step of configuring the data interface to direct data of subsequent data messages having a data format in common with the first data message only for data formats of one or more pre-set types.

35. The computer system as claimed in claim 34, wherein the said pre-set types are each defined by respective port numbers or ranges of port numbers.

36. The computer system as claimed in claim 19, wherein the data interface is configured to associate a predetermined data format with a region of the memory of the computer system external to the data interface that has been allocated for use as a buffer by a user-level application supported by the second operating system so as to, on subsequently receiving from the data source a data message of that format, automatically store data of that message in that region of the memory without it passing via the first or second operating systems.

37. The computer system as claimed in claim 19, further comprising a computer program configured to provide an operating system with functionality to, in response to detection that data of a first data message received by the data interface from the data source has been directed to a destination via another operating system, configure the data interface to direct data of subsequent data messages having a data format in common with the first data message to that destination without it passing via the second operating system.

38. A method for operating a computer system comprising hardware including a data interface for interfacing between the computer system and a data source, a memory, a first operating system capable of communicating with the hardware; and a second operating system capable of supporting a user-level application and being configured to communicate with the hardware via the first operating system, the second operating system being capable of allocating a region of the memory for use as a buffer by such a user-level application; the method comprising:

configuring the data interface to associate a predetermined data format with a region of the memory that has been allocated for use as a buffer by a user-level application supported by the second operating system; and the data interface on subsequently receiving from the data source a data message of that format, automatically storing data of that message in that region of the memory without it passing via the first or second operating systems.

39. A method for operating a computer system comprising:

hardware including a data interface for interfacing between the computer system and a data source; a memory; a first operating system capable of communicating with the hardware; and a second operating system capable of supporting a user-level application; the method comprising:

detecting by means of at least one of the first and second operating systems that data of a first data message received by the data interface from the data source has been directed to a destination via the first operating system; and in response to detecting that configuring the data interface by means of that operating system to direct data of subsequent data messages having a data format in common with the first data message to that destination without it passing via the first operating system.

\* \* \* \* \*

UNITED STATES PATENT AND TRADEMARK OFFICE
CERTIFICATE OF CORRECTION

| | | |
|---|---|---|
| PATENT NO. | : 8,286,193 B2 | Page 1 of 1 |
| APPLICATION NO. | : 12/215437 | |
| DATED | : October 9, 2012 | |
| INVENTOR(S) | : Steven Pope et al. | |

It is certified that error appears in the above-identified patent and that said Letters Patent is hereby corrected as shown below:

Title Page 1, Item (60), Related U.S. Application Data should read:

-- Continuation of application no. PCT/GB2006/004946 filed on Dec. 28, 2006 --

Title Page 1, Item (30), Foreign Application Priority Data should read:

-- Jan. 10, 2006 (GB)......................0600417.0 --

Signed and Sealed this
Thirty-first Day of December, 2013

Margaret A. Focarino
*Commissioner for Patents of the United States Patent and Trademark Office*